J. B. FARRIER.
Hose-Anchors.
No. 154,980.
Patented Sept. 15, 1874.
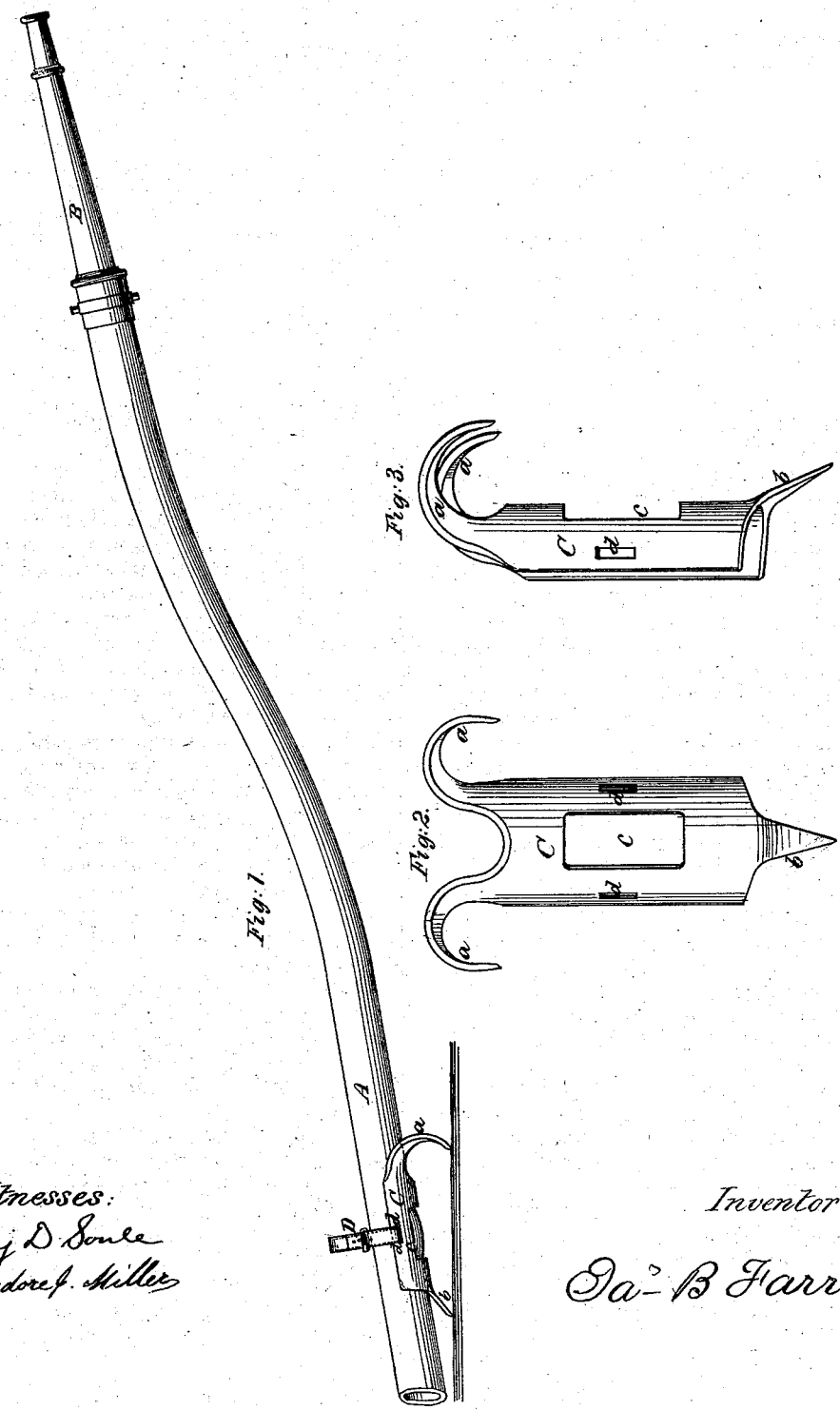

UNITED STATES PATENT OFFICE.

JAMES B. FARRIER, OF JERSEY CITY, NEW JERSEY.

IMPROVEMENT IN HOSE-ANCHORS.

Specification forming part of Letters Patent No. 154,980, dated September 15, 1874; application filed May 16, 1874.

*To all whom it may concern:*

Be it known that I, JAMES B. FARRIER, of 172 Grove street, Jersey City, in the county of Hudson and State of New Jersey, have invented a Hose-Anchor, of which the following is a specification:

The object of my invention is to reduce the number of men needed to handle and operate a hose when using the same on fires, and to enable the hose to be used in all positions with more freedom than heretofore. My invention consists in a metallic attachment to a fire-hose, which I call a hose-anchor, that is formed with a toe and hooks of a novel construction, and, being firmly secured to the hose at a distance of about five feet from the pipe, acts like an anchor whenever placed on the ground, whereby one man is enabled to drag and secure the hose to any place and position, and direct the pipe, without any assistance, while it took heretofore from four to six men to hold the hose in position, so as to enable a man to handle the pipe freely.

Figure 1 is a view of a portion of a hose with pipe embodying my invention. Figs. 2 and 3 are elevations of the anchor detached on a larger scale.

A is a hose as commonly used with fire-engines. B is the pipe for the same. About five feet from the pipe a metallic anchor, C, is firmly attached to the hose by means of a strap, D, or otherwise. Said anchor is preferably made of a piece of iron plate of a proper strength, bent semicircularly lengthwise, so as to partially inclose the hose. One end of said anchor is formed into hooks $a\ a$, with sharp points, while the other end is formed into a toe, $b$, also provided with a sharp point. The hooks $a\ a$ and toe $b$ are bent in such a manner that when the anchor is fastened to the hose, and then placed on the ground, the sharp points of the hooks $a\ a$ and toe $b$ will bite in the ground, as shown in Fig. 1, by the action of the back pressure of the water in the hose. An opening, $c$, in the body of the anchor is made to allow the hose A when full of water to expand partly into it, whereby, with the assistance of a strap, D, passing through the slots $d\ d$, said anchor is firmly secured to the hose.

By these means all the difficulties now existing in holding the hose and directing the pipe are obviated. One man will thus be enabled to drag the hose to any place on the ground, or up a ladder, and place it safely and firmly either on the pavement, a wooden floor, or on any kind of ground, or hook on the ladder, window-sill, roof-girder, or wherever the hooks will take hold, and be free to operate the pipe.

The action of the back pressure of the water passing through the hose and its own weight will always tend to force the anchor down, and thereby hold the hose steady.

What I claim, and wish to secure by Letters Patent, is—

The anchor C, with the hooks $a\ a$, toe $b$, and opening $c$, for attachment to a hose, A, substantially as and for the purpose herein specified.

JAS. B. FARRIER.

Witnesses:
BENJ. D. SOULÉ,
THEODORE J. MILLER.